(12) United States Patent
Atsumi

(10) Patent No.: US 6,873,484 B2
(45) Date of Patent: Mar. 29, 2005

(54) DISK DRIVE INCLUDING PERPENDICULAR MAGNETIC RECORDING SYSTEM WITH WRITE COMPENSATION

(75) Inventor: Masaru Atsumi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 406 days.

(21) Appl. No.: 10/234,195

(22) Filed: Sep. 5, 2002

(65) Prior Publication Data

US 2003/0103290 A1 Jun. 5, 2003

(30) Foreign Application Priority Data

Nov. 30, 2001 (JP) ........................................ 2001-367848

(51) Int. Cl.[7] ................................................ G11B 5/09
(52) U.S. Cl. .......................................... 360/51; 360/45
(58) Field of Search .......................... 360/75, 31, 321, 360/326, 51, 45, 53; 324/319

(56) References Cited

U.S. PATENT DOCUMENTS 5,187,622 A    2/1993  Watanabe
5,724,336 A    3/1998  Morton
2002/0034029 A1 *  3/2002  Aoyagi et al. ................ 360/31

FOREIGN PATENT DOCUMENTS

JP    App 3-44809    *  2/1991
JP    2000-207704       7/2000

* cited by examiner

Primary Examiner—Sinh Tran
Assistant Examiner—Mitchell Slavitt
(74) Attorney, Agent, or Firm—Pillsbury Winthrop LLP

(57) ABSTRACT

There is disclosed a disk drive of a perpendicular magnetic recording system including a write compensator against magnetic disturbance. The write compensator estimates strength and direction of the magnetic disturbance based on the detection result of the magnetic disturbance from a magnetic sensor during a write operation. The write compensator executes write compensation in accordance with the direction of the magnetic disturbance and the recording magnetization direction on a disk medium.

20 Claims, 7 Drawing Sheets

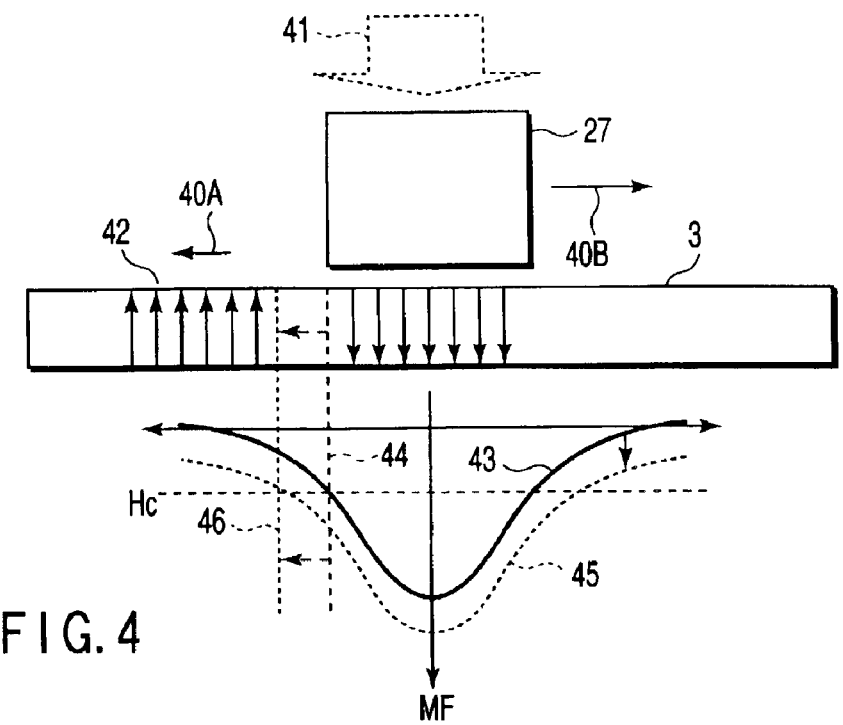
FIG. 4
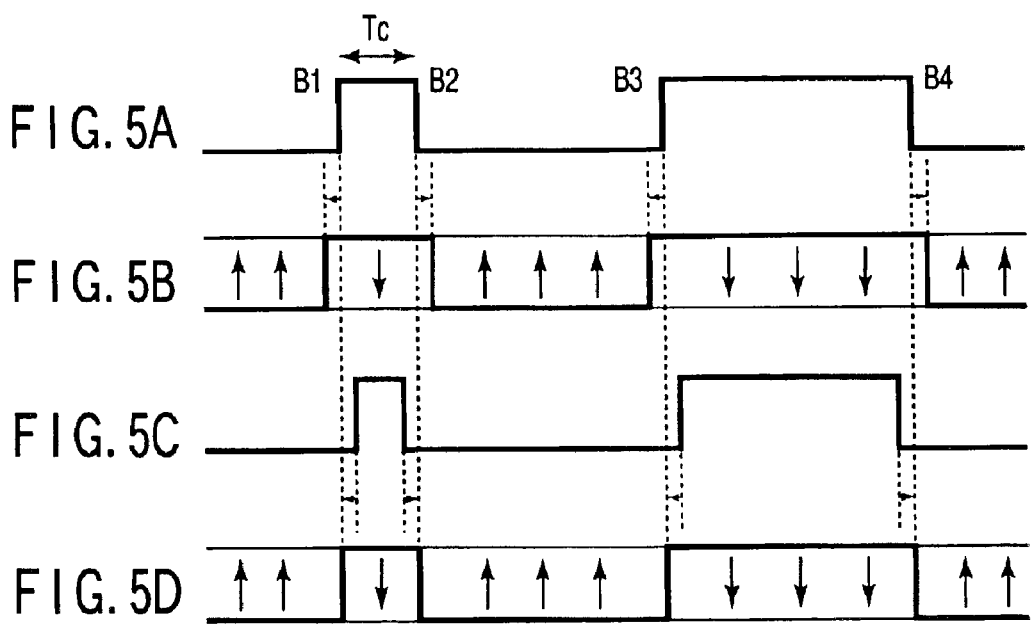
FIG. 5A
FIG. 5B
FIG. 5C
FIG. 5D

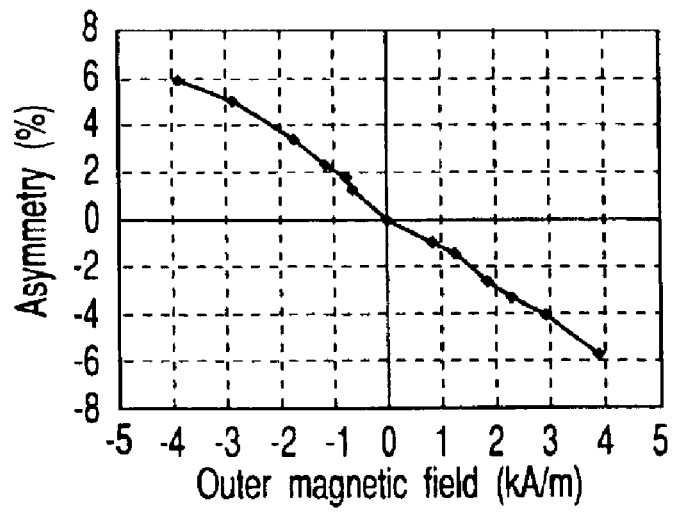
F I G. 9A
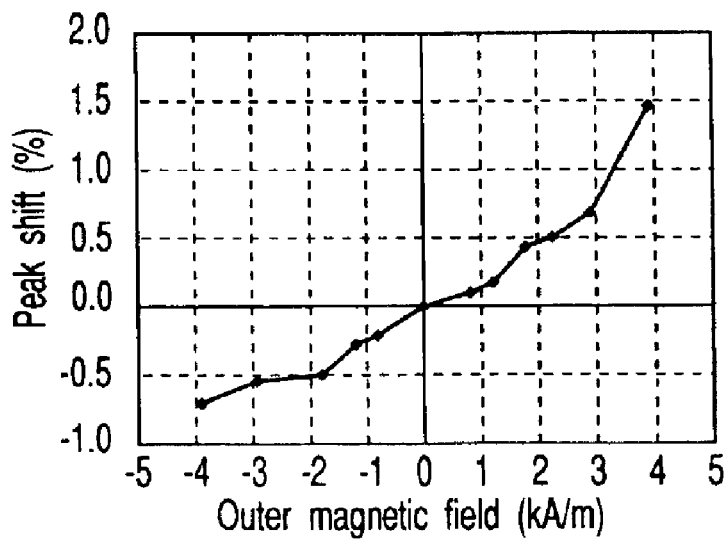
F I G. 9B
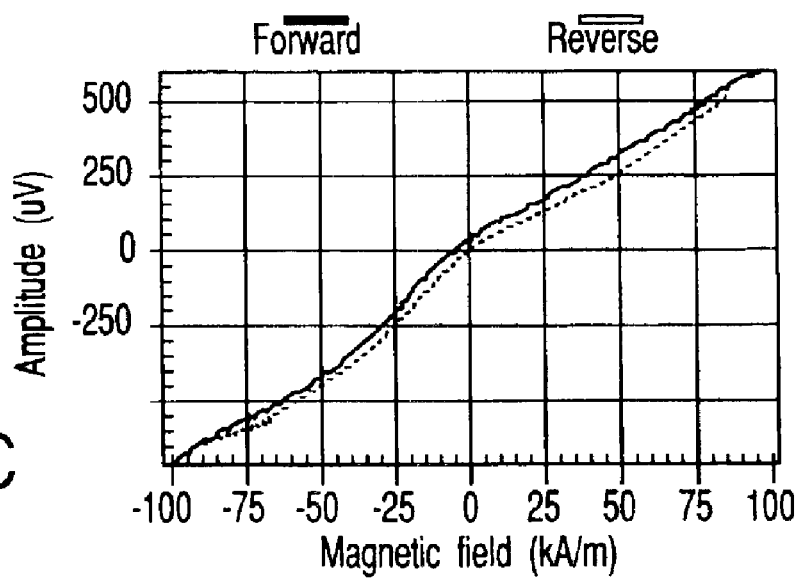
F I G. 9C

DISK DRIVE INCLUDING PERPENDICULAR MAGNETIC RECORDING SYSTEM WITH WRITE COMPENSATION

CROSS-REFERENCE TO RELATED APPLICATIONS

This application is based upon and claims the benefit of priority from the prior Japanese Patent Application No. 2001-367848, filed Nov. 30, 2001, the entire contents of which are incorporated herein by reference.

BACKGROUND OF THE INVENTION

1. Field of the Invention

The present invention generally relates to the field of a disk drive including a perpendicular magnetic recording system, particularly to a technique of write compensation which compensates for recording distortion resulting from magnetic disturbance.

2. Description of the Related Art

In recent years, a perpendicular magnetic recording system has attracted attention as a technique for exceeding the limit of recording density in the longitudinal magnetic recording system in the field of disk drive represented by a hard disk drive.

Additionally, in a conventional disk drive including the conventional longitudinal magnetic recording system, a nonlinear bit shift occurs in magnetic recording data recorded on a disk medium so that the magnetization transfer position (signal reverse position) shifts forward from the normal position by the influence of an adjacent bit pattern. Such a recording distortion phenomenon degrades the error rate during data reproduction (read operation).

To solve this, a write compensation operation for correcting magnetization transfer into the normal position is executed during the write operation. For the principle of the write compensation function, since the bit shift amount depends on the adjacent bit pattern, the bit shift amount (including direction) is predicted, the write timing is delayed, and as a result the magnetization transfer is corrected into the normal position.

On the other hand, in the disk drive including the perpendicular magnetic recording system, the magnetization transfer position shifts from the normal position in accordance with the adjacent bit pattern, but the direction differs from that of the longitudinal magnetic recording system. The recording distortion phenomenon occurs such that the transfer position shifts backwards. Therefore, in general, the write compensation function of allowing the write timing of the magnetization transfer to precede the normal position is required in the perpendicular magnetic recording system.

A write compensation method has heretofore been proposed which comprises: predicting a magnetization reverse position by the adjacent bit pattern beforehand in a recording signal series; and setting forward or delaying the magnetization reverse timing in accordance with the adjacent bit pattern (e.g., see Jpn. Pat. Appln. KOKAI Publication No. 2000-207704).

In recent years, a single pole type head has been used as a write head in a disk drive including the perpendicular magnetic recording system. Moreover, a double-layered disk medium is used as a disk medium.

The single pole type head includes a main pole and auxiliary pole, and magnetizes in a perpendicular direction (depth direction) of the disk medium with a recording magnetic field generated in the perpendicular direction from the main pole. Additionally, for example, a giant magnetoresistive (GMR) element is used in a read head similarly as the longitudinal magnetic recording system. The write head and read head are separately mounted on the same slider in the disk drive.

Moreover, a double-layered disk includes a recording layer indicating magnetic anisotropy of the perpendicular direction, and a soft magnetic layer between the recording layer and a substrate. The soft magnetic layer draws a magnetic flux generated from the main pole of the write head during the write operation so that the flux passes through the recording layer in the perpendicular direction, and guides the magnetic flux to the auxiliary pole. The soft magnetic layer has a function of supporting a so-called data recording operation.

In the disk drive including the above-described system, recording efficiency is high. However, when the disk is influenced by the magnetic field due to the magnetic flux floating outside (magnetic disturbance), recording distortion by nonlinear bit shift occurs particularly in the recording data on the disk right under the write head with a high possibility. Such a recording distortion phenomenon cannot be compensated by a read channel, and degrades the error rate during data reproduction. Therefore, a write compensation function is required against the magnetic disturbance, but the write compensation method according to the above-described related art cannot solve the problem because the bit shift by the magnetic disturbance is not assumed.

BRIEF SUMMARY OF THE INVENTION

An object of the present invention is to provide a disk drive including a perpendicular magnetic recording system for realizing an effective write compensation function against magnetic disturbance.

In accordance with one aspect of the present invention, there is provided a disk drive including a perpendicular magnetic recording system and facilities for write compensation to avoid recording distortion by magnetic disturbance.

The disk drive comprises: a disk medium in which a data signal is recorded by the perpendicular magnetic recording system; a magnetic head which performs write and read operations of the data signal with respect to the disk medium; a magnetic sensor which detects the magnetic disturbance in the vicinity of the disk medium; and a write compensator which executes write compensation in accordance with information on a magnetization direction of the magnetic disturbance detected by the magnetic sensor and the recording magnetization direction on the disk medium during the write operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a diagram showing perpendicular magnetic recording and bit shift according to the embodiment;

FIGS. 5A to 5D are timing charts showing a write compensation operation of the embodiment;

FIGS. 8A to 8E and 9A to 9C are explanatory views of modification examples of the first and second embodiments.

DETAILED DESCRIPTION OF THE INVENTION

Embodiments of the present invention will be described hereinafter with reference to the drawings.

Constitution of Disk Drive

Figure 1:
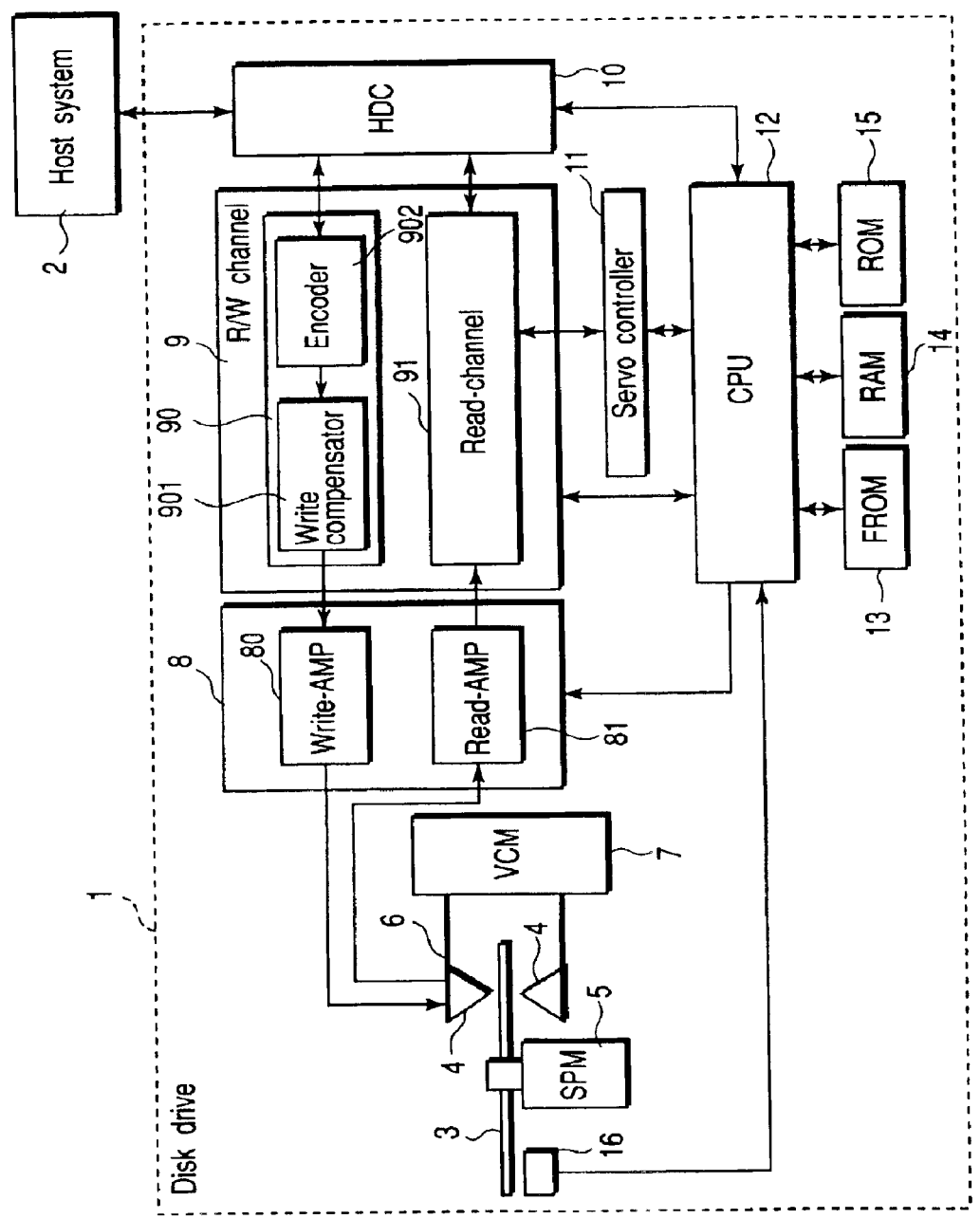
FIG. 1 is a block diagram showing a main part of a disk drive according to a first embodiment of the present invention.

FIG. 1 is a block diagram showing a main part of a disk drive including a perpendicular magnetic recording system according to a first embodiment.

As shown in FIG. 1, a disk drive 1 of the present embodiment includes a disk 3 including the perpendicular magnetic recording system, magnetic heads (hereinafter referred to as the heads) 4, a spindle motor (SPM) 5, and an actuator 6.

The disk 3 is a data recording medium, for example, including a single disk (may be a plurality of disks in some cases), and rotated/driven by the SPM 5. A large number of tracks each having a concentric circle shape are formed on data surfaces of the disk 3. A plurality of servo areas in which servo data for use mainly in a head positioning control (servo control) is recorded are arranged at equal intervals in each track. Each track includes a data area (recording area of user data) between the servo areas, and a plurality of data sectors are set in the data area.

The head 4 is mounted on the actuator 6, and disposed opposite to each data surface of the disk 3. The actuator 6 is a mechanism for moving the head 4 in a radial direction on the disk 3 by a driving force of a voice coil motor 7 by the servo control. The head 4 is a composite magnetic head constituted by separately mounting a write head for recording data and a read head for reproducing the data on the same slider. The read head is usually constituted of a giant magnetoresistive (GMR) element. The write head includes an inductive head element, and is a single pole type head adapted for the perpendicular magnetic recording system.

Furthermore, the disk drive includes a head amplifier circuit (preamplifier circuit) 8, read/write (R/W) channel 9, disk controller (HDC) 10, servo controller 11, and microprocessor (CPU) 12.

The head amplifier circuit 8 realizes an input/output function of a read/write signal with respect to the head 4, change function of the head 4, and amplification function of the read/write signal. A write amplifier 80 converts write data (recording signal) from a write channel 90 described later into a write current and supplies the current to the write head. A read amplifier 81 amplifies a read signal output from the read head and sends the signal to a read channel 91.

The read/write channel 9 is a read/write signal processing circuit, and also includes a signal processing function of extracting the servo data together with the user data from the read signal. The read channel 91 includes circuits such as a decoder, inputs the read signal amplified by the read amplifier 81, and executes signal processing necessary for a data reproduction operation.

The write channel 9 includes a write compensator 901 and an encoder 902 for encoding the write data, and generates the recording signal for performing perpendicular magnetic recording. The write compensator 901 also includes a write compensation function against magnetic disturbance as described later, and performs write compensation processing to set the reverse position of the recording signal backward or forward from the normal position.

The HDC 10 constitutes an interface with the drive and a host system 2, and controls communication of command and read/write data with respect to the host system 2. Moreover, the HDC 10 controls the communication of the read/write data with respect to the disk 3 via the read/write channel 9. The host system 2 corresponds to each type of test apparatus in a manufacturing process, and corresponds to a personal computer (including a portable information terminal) or each type of digital apparatus after product shipping.

The servo controller 11 has a timing generation function of generating each type of timing signal of a servo gate, which becomes valid only for the time of the servo area, from the servo data extracted by the read channel 91. Moreover, the servo controller 11 has a decode function of decoding a cylinder code (track address) in the servo data recorded in the servo area.

The CPU 12 is usually the main control apparatus of the drive, which executes various types of control operations in accordance with a control program stored in a ROM 15. Concretely, the CPU 12 uses the cylinder code extracted by the servo controller 11, and servo burst data in the servo data extracted by the read channel 91 to execute servo control for positioning the head 4 in a target position on the disk 3.

Figure 6:
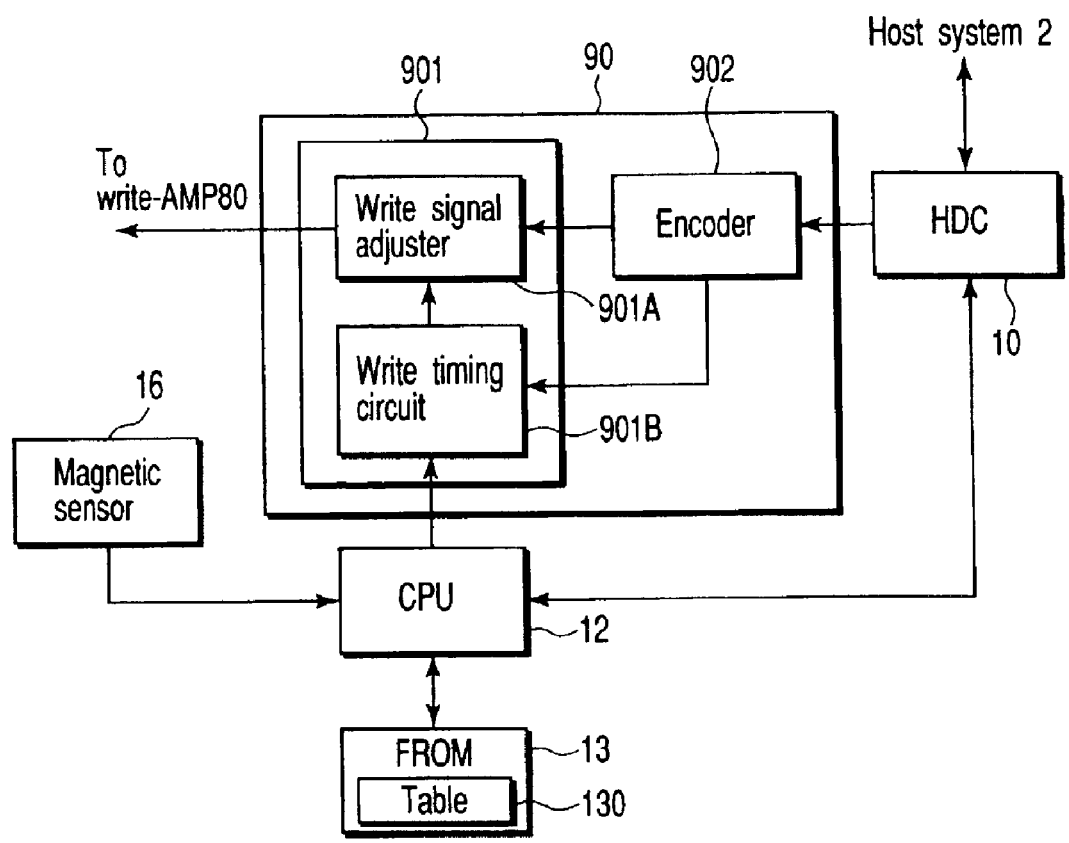
FIG. 6 is a block diagram showing a constitution of a write compensation circuit of the embodiment.

Furthermore, the CPU 12 executes control concerning the write compensation operation for eliminating recording distortion by magnetic disturbance based on detection information of the magnetic disturbance from a magnetic sensor 16 (or a GMR element described later) disposed in the vicinity of the disk 3, and a table (130 of FIG. 6) for write compensation (see FIG. 6).

The CPU 12 is connected to not only the ROM 15 but also a RAM 14 which functions as a working memory of the CPU 12. Moreover, the CPU 12 is connected to a rewritable flash memory (flash EEPROM) 13 for storing the table for write compensation, parameters for various types of controls, and the like according to the first embodiment.

Table for Write Compensation

In the first embodiment, the CPU 12 refers to the table for write compensation stored in the flash memory 13 to obtain a write compensation amount for eliminating the recording distortion by the magnetic disturbance. The CPU 12 issues an instruction for the write compensation together with the write compensation amount to the write compensator 901 included in the write channel 90.

The table for write compensation is generated by predetermined test processing by a test apparatus during manufacture of the disk drive. That is, as shown in FIG. 6, the test apparatus as the host system 2 is connected to the disk drive via the HDC 10. The test apparatus 2 calculates an optimum write compensation amount associated with each information including a magnetization direction, adjacent recording pattern (adjacent bit pattern) and strength of the magnetic disturbance for each head 4, and registers the amount as a table for write compensation 130 in the flash memory 13.

Structure of Head and Disk

Figure 2:
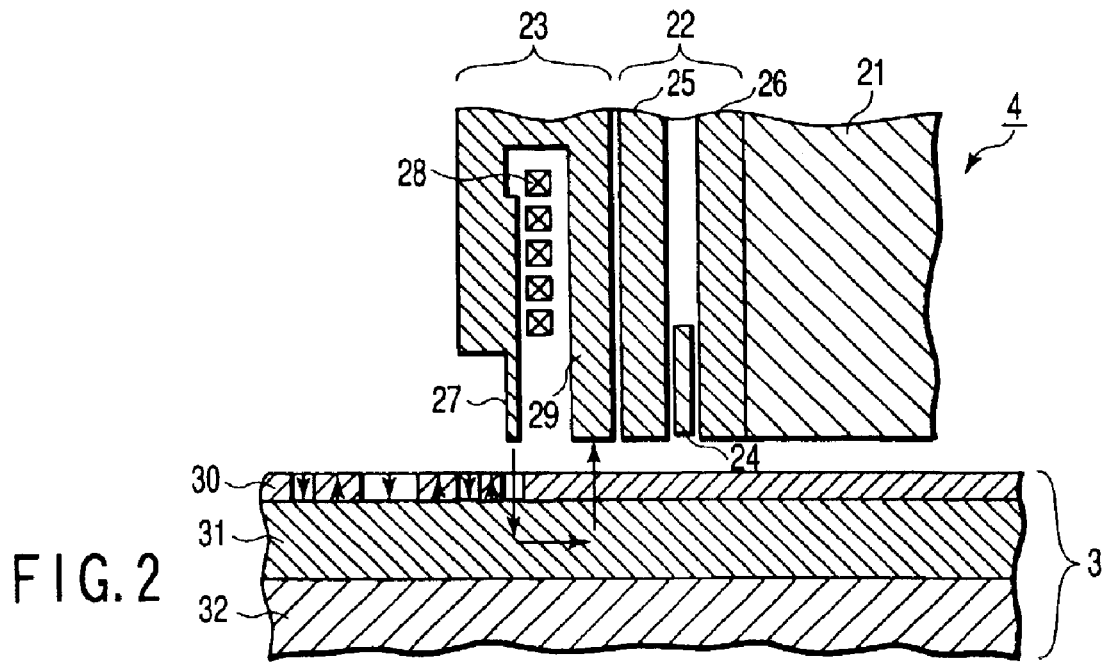
FIG. 2 is a sectional view showing structures of a magnetic head and disk according to the embodiment.

FIG. 2 shows structures of the head 4 and disk 3 for use in the disk drive of the first embodiment.

The head 4 includes a read head 22 on a slider 21 side, and a write head 23 behind the read head. The read head 22 includes a GMR element 24, upper shield core 25, and lower shield core 26. The GMR element 24 is disposed in a space which forms a predetermined gap defined between the pair of shield cores 25, 26.

The write head 23 is an inductive/single pole type head including an upper magnetic pole (main pole) 27, coil 28, and lower magnetic pole (auxiliary pole) 29. For the main pole 27, a pole tip end has a structure peculiar to the perpendicular magnetic recording system, and magnetizes in a depth direction of the disk 3 with the magnetic flux of the perpendicular direction. The auxiliary pole 29 lifts up the magnetic flux flowing into the disk 3 from the main pole 27 and forms a magnetic flux path.

On the other hand, the disk 3 of the first embodiment is a double-layered disk including a recording layer 30 exhibiting magnetic anisotropy of the perpendicular direction, and a soft magnetic layer 31 between the recording layer 30 and a substrate 32. The soft magnetic layer 31 draws the magnetic flux generated from the main pole 27 in the perpendicular direction, and fulfils an auxiliary role for perpendicularly magnetizing the recording layer 30. The magnetic flux flowing into the soft magnetic layer 31 passes in a longitudinal direction, and flows into the auxiliary pole 29. That is, the magnetic flux generated by the main pole 27 forms a magnetic flux path including the recording layer 30, soft magnetic layer 31, and auxiliary pole 29.

Write Compensation Operation

A write compensation operation in the perpendicular magnetic recording of the first embodiment will be described.

First, the perpendicular magnetic recording and bit shift phenomenon due to the magnetic field of the magnetic disturbance will be described with reference to FIGS. 3A, 3B and 4.

As shown in FIG. 4, the magnetic flux of the perpendicular direction is applied to the rotating disk 3 (rotation direction 40A) from the main pole 27 of the write head (relative running direction 40B). Through the recording operation, magnetization transfer remains as data 42 on the disk 3 on a trailing edge side of the main pole 27.

Here, when there is no influence of magnetic disturbance 41 of the perpendicular direction, a distribution of the recording magnetic field (MF) applied to the disk 3 from the main pole 27 is obtained as shown by a solid line 43. Additionally, for the sake of convenience, the influence of the recording magnetic field from the adjacent bit pattern is ignored. In a region in which the recording magnetic field exceeds a coercive field strength (Hc), the magnetization is reversed on the disk 3, a magnetization transfer position is obtained as shown by a dotted line 44, and this position is assumed as a normal magnetization reverse position.

On the other hand, when the head 4 is influenced by the magnetic disturbance 41 of the perpendicular direction, the magnetic fluxes generated by the write current and by the magnetic disturbance 41 are added to the main pole 27, and the distribution of the recording magnetic field (MF) applied to the disk 3 is obtained as shown by a dotted line 45. That is, an offset is generated with respect to the recording magnetic distribution shown by the solid line 43. In this case, the magnetization transfer position 46 shifts backward in the running direction 40B of the head 4 from the normal magnetization reverse position 44.

Here, when the direction of the recording magnetic field (depth direction of the disk) is influenced by a reverse upward magnetic disturbance, the distribution of the recording magnetic field shifts in a downward direction with respect to the solid line 43 (direction of a front surface side of the disk 3), and the magnetization transfer position moves forward from the normal magnetization reverse position 44. In short, when the magnetic disturbance acts in a direction (the same direction) for assisting the recording magnetic field by the main pole 27 of the write head, the magnetization transfer position shifts backward from the normal position. Moreover, when the disturbance acts in a reverse direction, the position shifts forward. This phenomenon is a bit shift phenomenon by the magnetic disturbance, and causes recording distortion in the perpendicular magnetic recording.

Figure 3A:
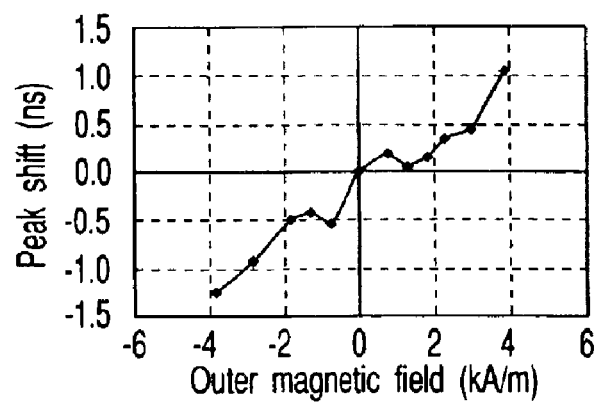
FIGS. 3A and 3B are diagrams showing a relation between a bit shift amount and error rate with respect to a magnetic disturbance according to the embodiment.
Figure 3B:
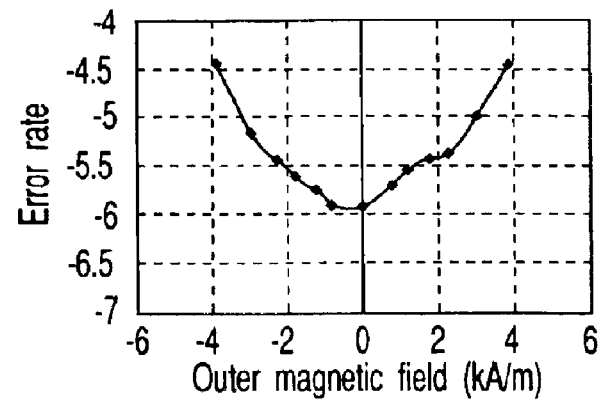

FIG. 3A shows a change of the bit shift amount with respect to the magnetic disturbance during the write operation (data recording). Moreover, FIG. 3B shows the relation of the error rate with respect to the magnetic disturbance in the read operation (data reproduction). From this, it can be confirmed that the recording bit shift amount on the disk 3 increases by the influence of the magnetic disturbance of the data recording time and that the error rate of the data reproduction time largely fluctuates accordingly.

A write compensation operation for eliminating the recording distortion by the bit shift will be described with reference to FIGS. 5 and 6.

First, for example, when the host system 2 including the personal computer issues a write command, the CPU 12 deciphers the command via the HDC 10. On receiving the recording data transferred from the HDC 10 with the command, the write channel 90 converts the recording data into predetermined encoded data by means of the encoder 902.

FIG. 5A shows one example of the write signal corresponding to the encoded data from the encoder 902. Here, the write head is magnetized in the depth direction (downward direction) with respect to the disk 3, when the write signal exhibits a logic level "H". The write head is magnetized in a front surface side direction (upward direction), when the signal indicates a logic level "L" (see FIG. 5B). Additionally, Tc in the drawings indicates a bit interval, and corresponds to a shortest signal reverse interval.

Here, as described above, when the main pole 27 of the write head is influenced by the magnetic field of the magnetic disturbance in the downward direction, as shown in FIG. 5B, downward magnetization transfers B1, B3 having the same direction as that of the magnetic field of the magnetic disturbance precede the normal magnetization reverse position. Conversely, upward magnetization transfers B2, B4 shift backward. The bit shift amount changes in accordance with the strength of the magnetic field of the magnetic disturbance. Additionally, for the sake of convenience, the bit shift amount by the influence of the magnetic field by the adjacent bit pattern is ignored.

In the first embodiment, during the data recording in accordance with the write command, the CPU 12 refers to the write compensation table 130 of the flash memory 13 to select an optimum write compensation amount based on information on the magnetic disturbance from the magnetic sensor 16 (magnetic flux direction and strength of the magnetic disturbance), and sends the amount to the write compensator 901.

In the write compensator 901, a write timing circuit 901B obtains a write timing for performing the write compensation from the recording pattern obtained from the encoder 902 and the write compensation amount from the CPU 12, and indicates the timing to a write signal adjuster 901A. Concretely, the write timing circuit 901B executes judgment processing of the reverse direction of the recording magnetization and the direction of the magnetic disturbance, and judgment processing of a forward or delay timing of the magnetization reverse by the judgment result (agreement or disagreement of the directions). The write timing circuit 901B transmits the instruction of forward or delay timing and the compensation amount (bit shift amount) to the write signal adjuster 901A.

The write signal adjuster 901A adjusts the write timing of the recording signal so as to meet the direction and strength of the magnetic field by the magnetic disturbance in accordance with the instruction of the write timing adjustment from the write timing circuit 901B as shown in FIG. 5C. The write amplifier 80 converts the recording signal adjusted (subjected to the write compensation) by the write signal adjuster 901A into the write current, and supplies the current to the write head. Therefore, as shown in FIG. 5D, the write head perpendicularly and magnetically records the recording data whose magnetization is reversed in the normal position onto the disk 3.

As described above, according to the first embodiment, the CPU 12 uses the detection result of the magnetic disturbance from the magnetic sensor 16 (the direction and strength of the magnetic field) and the prepared write compensation table 130 to instruct the write compensation for eliminating the recording distortion generated by the influence of the magnetic disturbance to the write channel 90.

In the write channel 90, the write compensator 901 executes the write compensation at the write timing delayed from the normal magnetization reverse position, when the magnetization direction of the magnetic disturbance agrees with the direction of the recording magnetization with respect to the write signal.

On the other hand, when the direction of the magnetic disturbance disagrees with the recording magnetization direction, the write compensation is executed at the write timing set before the normal magnetization reverse position. In this case, the bit shift amount is determined in accordance with the magnetization strength of the magnetic disturbance.

Therefore, even under the influence of the magnetic disturbance with respect to the write head during the perpendicular magnetic recording, the write compensation function adapted for the magnetic disturbance can realize perpendicular magnetic recording in which the normal position corresponds to the magnetization transfer position as a result. Therefore, when the influence of the recording distortion can be suppressed during data reproduction, data reproduction at an optimum read error rate can be realized.

Second Embodiment

Figure 7:
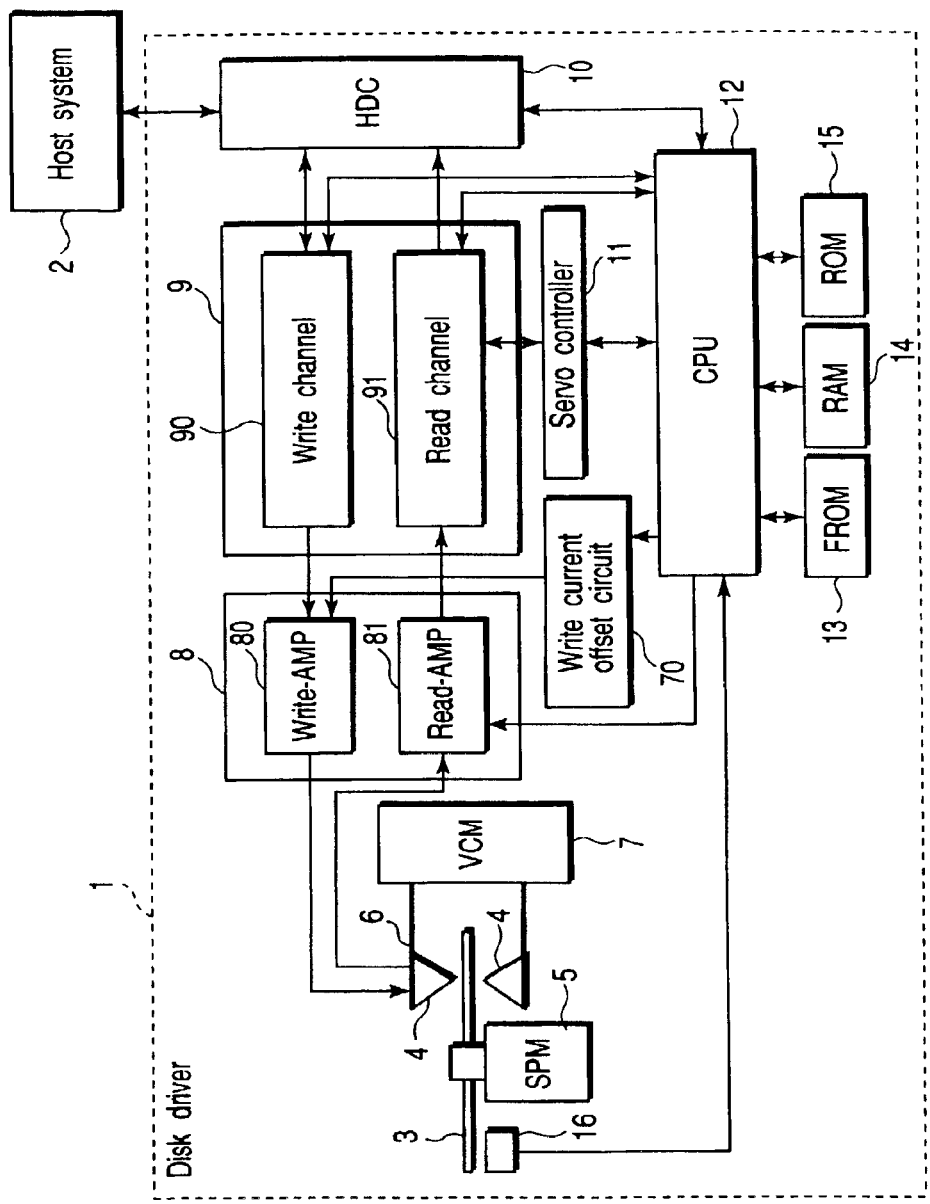
FIG. 7 is a block diagram showing the main part of the disk drive according to a second embodiment.

FIG. 7 is a block diagram showing the main part of the disk drive according to a second embodiment of the present invention.

The second embodiment relates to a compensation method as the write compensation function of adjusting (offsetting) a write current pattern output from the write amplifier 80 by a write current offset circuit 70 shown in FIG. 7 and eliminating the recording distortion by the magnetic disturbance.

Concretely, this is a perpendicular write compensation function of offsetting the write current pattern so as to change the recording magnetic distribution 45 shown in FIG. 4 to the normal recording magnetic distribution 43. Additionally, elements other than constituting elements related to the second embodiment are similar to those of the first embodiment shown in FIG. 1, and are therefore denoted to the same reference numerals, and the description thereof is omitted.

First, the principle of the write compensation function of the second embodiment lies in that the recording magnetic field, that is, the write current pattern is offset in a direction for canceling the magnetic disturbance, the bit shift is thereby eliminated, and the magnetization reverse is obtained in the normal position.

Concretely, when the recording magnetic field and magnetic disturbance have the same direction as shown in FIG. 4, the magnetic disturbance acts in a direction to strengthen the recording magnetic field, and therefore recording distortion occurs. Therefore, in this case, the recording magnetic field is weakened, that is, the write current is reduced, so that the bit shift can be eliminated.

Conversely, the magnetic disturbance acts in a reverse direction with respect to the recording magnetic field, and acts in the direction in which the recording magnetic field is weakened. In this case, the write current is increased so that the bit shift can be eliminated. Moreover, since the offset amount of the recording magnetic distribution of the main pole 27 changes with the strength of the magnetic disturbance, it is necessary to adjust the offset amount of the write current accordingly.

The second embodiment will concretely be described hereinafter with reference to FIG. 7.

In a Similar way to the first embodiment, during the write operation, the CPU 12 refers to a write current offset amount table stored beforehand in the flash memory 13 and selects write current offset information based on detection information (the direction and strength of the magnetic disturbance) from the magnetic sensor 16.

For the write current offset amount table, a value optimized using a read error rate as an index is calculated and stored in the flash memory 13 by the predetermined test apparatus during the manufacture of the disk drive.

The CPU 12 sets the write current offset information suitable for the magnetic disturbance into the write current offset circuit 70 from the write current offset amount table. The write current offset circuit 70 calculates a write current value in accordance with a positive/negative recording magnetization direction from the write current offset information and supplies the value to the write amplifier 80 in order to eliminate the bit shift by the magnetic disturbance. The write amplifier 80 receives the write current value, and supplies the different positive/negative write currents to the write head in synchronization with the recording magnetization direction from the write channel 90.

As described above, according to the second embodiment, there can be realized a write compensation function of adjusting the write current pattern output from the write amplifier 80 in accordance with the magnetic disturbance and eliminating the recording distortion by the magnetic disturbance. In other words, the write amplifier 80 is used which can vary the write current value in accordance with the recording magnetization direction. Thereby, the bit shift amount of the recording data on the disk 3 can be adjusted.

Here, with the write compensation method of the second embodiment, the write compensation circuit in the write channel 90 can be limited to a function of compensating only for the bit shift by the adjacent pattern bit. Therefore, the write compensation resulting from the adjacent bit shift is executed by the write channel 90. The write compensation resulting from the magnetic disturbance is distinguished from the above-described compensation and executed by the write amplifier 80. Therefore, it is easy to adjust the bit shift amount.

In short, according to the above-described embodiments, particularly when the single pole type head is used as the write head, and is applied to the disk drive using the double-layered disk and including the perpendicular magnetic recording system, recording distortion resulting from magnetic disturbance during the write operation can be eliminated. Therefore, it is possible to suppress the degradation of the read error rate resulting from the recording distortion during the data reproduction for reproducing the data recorded on the disk. In the disk drive including the perpendicular magnetic recording system, the perpendicular write compensation function of eliminating the bit shift of the recording data and compensating for the recording distortion based on the detection result of the magnetic disturbance can be realized during the write operation. Therefore, when the write compensation function effective against the magnetic disturbance is realized, the error rate of the data reproduction time can be enhanced.

Modification Example

As described above, in the respective embodiments, a magnetic sensor 16 for detecting the magnetic disturbance is disposed. The present modification example is a constitution in which the GMR element constituting the read head of the head 4 is used as an alternative to the magnetic sensor 16. That is, during the write operation, the CPU 12 reads the predetermined pattern included in servo data by the GMR element and estimates the strength and direction of the magnetic disturbance from the read signal waveform.

This example will concretely be described hereinafter with reference to FIGS. 8A to 8E and 9A to 9C.

Figure 8A:
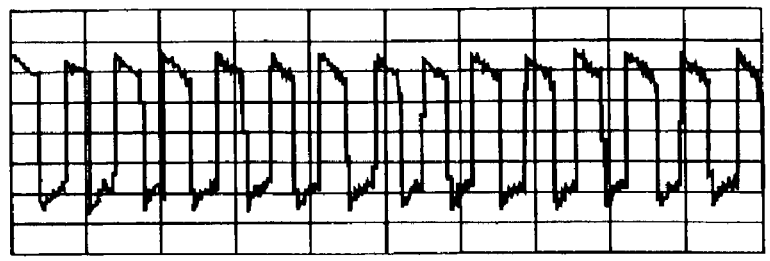

Since the magnetic field flowing into the GMR element from the disk 3 is large in the perpendicular magnetic recording, waveform distortion occurs in the read signal waveform from the GMR element with a large influence of the magnetic disturbance. For example, as shown in FIG. 8A, the read signal waveform corresponding to an isolated waveform recorded in a state in which there is magnetic disturbance exhibits a waveform in which a fluctuation of output amplitude is caused by the magnetic disturbance as shown in FIG. 8A.

Figure 8B:
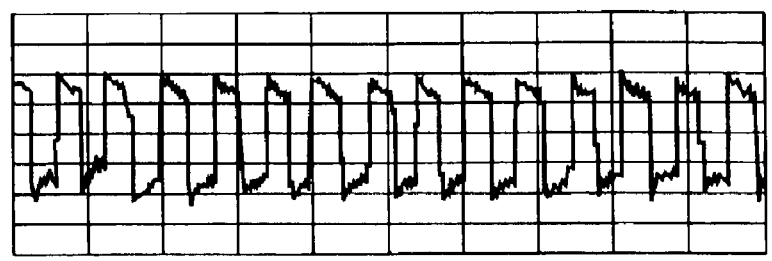

On the other hand, the read signal waveform in a state in which there is no magnetic disturbance is the waveform shown in FIG. 8B. The CPU 12 estimates the strength of the magnetic disturbance based on the fluctuation of the output amplitude.

Figure 8C:

Moreover, the CPU 12 estimates the direction of the magnetic disturbance from the read signal waveform corresponding to a specific pattern included in the servo data. Concretely, as shown in FIG. 8C, the read signal waveform having a repeated pattern of a high-frequency signal and DC is estimated. Here, a DC portion preferably has a high sensitivity, when the influence of interference of a high-frequency signal portion is not exerted. However, when the output of the DC pattern portion is higher than the output of the high-frequency signal, it is possible to estimate the waveform. Furthermore, it is characteristic that the magnetization reverse of the high-frequency signal is performed by an odd number of times. In the present modification example, an FFFF 80 pattern in NRZI notation is used.

Figure 8D:
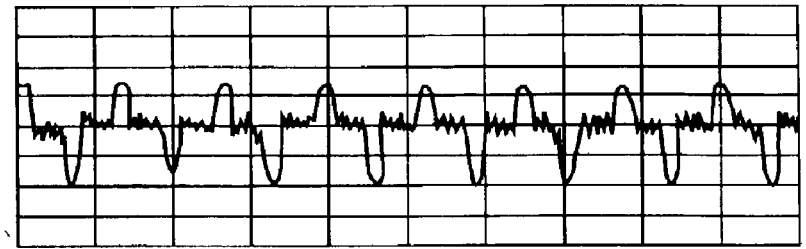
Figure 8E:
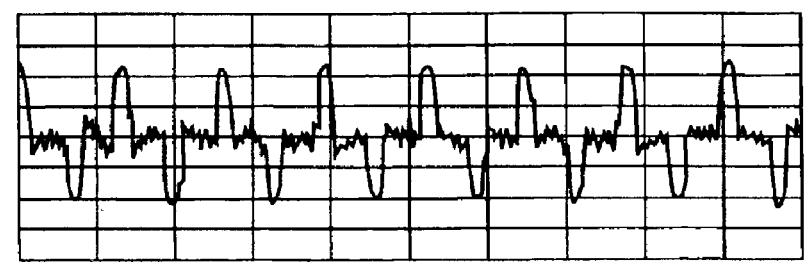

Furthermore, when the magnetic disturbance is applied in the positive/negative direction of the specific pattern, the read signal waveform is obtained as shown in FIGS. 8D, 8E. As apparent from FIGS. 8D, 8E, the upper/lower symmetry of a low-frequency portion is reversed by the application direction of the magnetic disturbance. Particularly, the application of the magnetic disturbance in a ferromagnetic field is remarkable in FIG. 8D.

FIG. 9A shows the relation between the magnetic disturbance and index, assuming that a DC output directed upward from a middle of the high-frequency waveform is A, a downward DC output is B, and (A−B)/(A+B) is the index (asymmetry: Asym-Dis). The strength and direction of the magnetic disturbance can be specified by the index.

Moreover, the read signal waveform is a rectangular wave in perpendicular magnetic recording. Therefore, when a differentiating circuit is disposed in the read channel, and the read signal rectangular wave is converted to a differentiating waveform, a signal processing system similar to a longitudinal magnetic recording system can be used. In this case, since the read signal waveform of the isolated waveform is similar to the waveform of the longitudinal magnetic recording system, the waveform distortion influenced by the magnetic disturbance appears as a change of peak shift as shown in FIG. 9B. As shown in FIG. 9B, the peak shift has a one-to-one correspondence to the magnetic disturbance and direction, and can be used in detecting the strength and direction of the magnetic disturbance.

In short, according to the above-described modification example, the specific pattern is recorded continuously with or in the vicinity of the servo data (servo pattern) in the servo area on the disk 3. The specific pattern is read out by the GMR element as a read head during the write operation. The CPU 12 estimates the strength and direction of the magnetic disturbance from the read signal waveform corresponding to the specific pattern. Therefore, it is unnecessary to dispose the special magnetic sensor 16 for detecting the magnetic disturbance inside the disk drive.

Here, some of the disk drives include the read amplifier 81 on which a monitor terminal for monitoring the MR resistance value of the GMR element is mounted. The GMR element changes not only with a change of the resistance value by the recording magnetic field on the disk 3 but also with a fluctuation of an outer magnetic field (magnetic disturbance).

FIG. 9C shows a relation between the magnetic disturbance on the abscissa and the monitor output (amplitude value) on the ordinate. That is, it is apparent that the monitor output (amplitude value) has a one-to-one correspondence with respect to the magnetic disturbance. Therefore, the CPU 12 monitors the MR resistance value of the GMR element of the read head and can thereby detect the magnetic disturbance.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:
   a disk medium in which a data signal is recorded by a perpendicular magnetic recording system;
   a magnetic head which performs write and read operations of the data signal with respect to said disk medium;
   a magnetic sensor which detects a magnetic disturbance in the vicinity of said disk medium; and
   a write compensator which calculates a magnetization direction of said magnetic disturbance in accordance with a detection result from said magnetic sensor, and executes a write compensation in accordance with information on the magnetization direction and a recording magnetization direction on said disk medium during the write operation.

2. A disk drive according to claim 1, wherein said write compensator compensates for a bit shift of a data bit string perpendicularly and magnetically recorded on said disk medium.

3. A disk drive according to claim 1, wherein said write compensator accelerates or delays write magnetization timing with respect to a normal magnetization reverse position of data perpendicularly and magnetically recorded on said disk medium and thereby compensates for a bit shift.

4. A disk drive according to claim 1, wherein said write compensator includes a table for write compensation in which strength and direction of said magnetic disturbance and a recording pattern on said disk medium are associated with one another, and
   refers to the table for write compensation to compensate for a bit shift of a data bit string.

5. A disk drive according to claim 1, wherein said write compensator includes a table for write compensation in which strength and direction of said magnetic disturbance and a recording pattern on said disk medium are associated with one another, and
   refers to said table for write compensation and accelerates or delays recording magnetization timing with respect to a normal magnetization reverse position of data perpendicularly and magnetically recorded on said disk medium to compensate for a bit shift.

6. A disk drive according to claim 1, wherein said disk medium includes a perpendicular magnetic recording layer, and a soft magnetic layer disposed between the perpendicular magnetic recording layer and a substrate.

7. A disk drive according to claim 1, wherein said magnetic head includes write and read heads, and
   the write head includes a single pole type head which applies a recording magnetic field in a perpendicular direction to said disk medium.

8. A disk drive according to claim 1, wherein said disk medium includes a perpendicular magnetic recording layer, and a soft magnetic layer disposed between the perpendicular magnetic recording layer and a substrate,
   said magnetic head includes write and read heads, and
   the write head includes a single pole type head including a main pole which generates a magnetic flux in a perpendicular direction to said disk medium, and an auxiliary pole constituting a magnetic flux path together with said main pole and soft magnetic layer.

9. A disk drive according to claim 1, wherein said magnetic head includes a giant magnetoresistive (GMR) element as a read head, and
   said write compensator includes a device which uses the GMR element as said magnetic sensor and estimates strength and direction of said magnetic disturbance in accordance with a signal waveform output from the GMR element.

10. A disk drive according to claim 9, wherein a disturbance detecting pattern for detecting said magnetic disturbance is recorded beforehand in a servo area disposed on said disk medium, and
    said write compensator includes a device to estimate strength and direction of said magnetic disturbance in accordance with a read signal waveform obtained when said GMR element reads the disturbance detecting pattern.

11. A disk drive according to claim 10, wherein said disturbance detecting pattern includes a repeated pattern of a high-frequency signal pattern in which an odd number of magnetization reverses are performed.

12. A disk drive according to claim 10, wherein said disturbance detecting pattern includes a repeated pattern in which a peak shift of a low-frequency differentiating waveform is used as an index.

13. A disk drive according to claim 1, wherein said magnetic sensor includes a device which outputs detection information indicating strength and direction of said magnetic disturbance.

14. A disk drive according to claim 1, further comprising:
    a write channel which outputs a write current pattern corresponding to recording data to a write head included in said magnetic head during the write operation,
    wherein said write compensator executes the write compensation so as to give an offset to the write current pattern in accordance with said information.

15. A disk drive according to claim 14, wherein said write compensator includes a table for write compensation in which strength and direction of said magnetic disturbance and a recording pattern on said disk medium are associated with one another, and
    refers to the table for write compensation and executes the write compensation so as to give the offset to said write current pattern.

16. A disk drive according to claim 1, further comprising:
    a write channel which outputs a write current pattern corresponding to recording data during the write operation; and a write amplifier which supplies a write current corresponding to the write current pattern to a write head included in said magnetic head,
    wherein said write compensator executes the write compensation so as to vary a write current value output from said write amplifier in accordance with said information.

17. A method of write compensation for a disk drive which includes a perpendicular magnetic recording type disk medium and a magnetic head for reading/writing data from/to the disk medium, the method comprising:
    detecting a magnetic disturbance in the vicinity of said disk medium;
    executing write compensation in accordance with information on the magnetic disturbance detected by said detecting step and a recording magnetization direction on said disk medium during a write operation; and
    executing the write operation on said disk medium by said magnetic head in accordance with a recording pattern write-compensated by said write compensation step.

18. A method according to claim 17, wherein said disk drive includes a table for write compensation in which strength and direction of said magnetic disturbance and the recording pattern on said disk medium are associated with one another, and said write compensation step includes: referring to the table for write compensation; and compensating for a bit shift of a data bit string written on said disk medium.

19. A method according to claim 17, wherein said detecting step includes: using a giant magnetoresistive (GMR) element constituting a read head included in said magnetic head; and estimating the strength and direction of said magnetic disturbance in accordance with a signal waveform output from the GMR element.

20. A method according to claim 17, wherein said disk drive includes a write channel which outputs a write current pattern corresponding to recording data to a write head included in said magnetic head during the write operation, and said write compensation step includes: executing the write compensation in accordance with information on the magnetic disturbance detected by said detecting step and a recording magnetization direction on said disk medium so as to give an offset to the write current pattern.

* * * * *